United States Patent
Khojastepour et al.

(10) Patent No.: US 9,083,404 B2
(45) Date of Patent: Jul. 14, 2015

(54) LINEAR PRECODING IN MIMO BROADCAST CHANNEL WITH ARBITRARY RANK CONSTRAINTS

(75) Inventors: Mohammad A. Khojastepour, Lawrenceville, NJ (US); Mohammad A. Khajehnejad, Pasadena, CA (US); Guosen Yue, Plainsboro, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 739 days.

(21) Appl. No.: 13/234,652

(22) Filed: Sep. 16, 2011

(65) Prior Publication Data

US 2012/0069924 A1    Mar. 22, 2012

Related U.S. Application Data

(60) Provisional application No. 61/384,143, filed on Sep. 17, 2010.

(51) Int. Cl.
H04B 7/04    (2006.01)

(52) U.S. Cl.
CPC ............ *H04B 7/0486* (2013.01); *H04B 7/0465* (2013.01)

(58) Field of Classification Search
CPC .......... H04B 7/02; H04B 7/024; H04B 7/026; H04B 7/0404; H04B 7/0413; H04B 7/0452; H04B 7/0456; H04B 7/0486; H04B 7/06; H04L 25/03898; H04L 25/0391; H04L 25/03923; H04L 25/03968
USPC ................. 375/133, 135, 141, 146, 260, 267; 370/208, 210, 339; 455/39, 500, 513, 455/517
See application file for complete search history.

(56) References Cited

U.S. PATENT DOCUMENTS

| | | | |
|---|---|---|---|
| 2011/0080961 A1* | 4/2011 | Hui et al. | 375/259 |
| 2012/0082259 A1* | 4/2012 | Yue et al. | 375/285 |
| 2013/0223555 A1* | 8/2013 | Sheng et al. | 375/267 |

OTHER PUBLICATIONS

Fung et al., "Precoding for the Multiantenna Downlink: Multiuser SNR Gap and Optimal User Ordering", IEEE Transactions on Communications, vol. 55, No. 1, Jan. 2007, pp. 188-197.
Stojnic et al., "Rate maximization in multiantenna broadcast chanels with linear preprocessing," IEEE Trans. Wireless Commun., vol. 5, No. 9, Sep. 2006. (13 pages).
Tenenbaum et al., "Sum rate maximization using linear precoding and decoding in the multiuser MIMO downlink," arXiv.org > cs > arXiv:0801.0340, Jan. 2008. (7 pages).
Tenenbaum et al., "Improved sum-rate optimization in the multiuser MIMO downlink," in 42nd Annual Conference on Information Sciences and Systems, CISS, Mar. 2008, pp. 984-989.

(Continued)

*Primary Examiner* — Young T Tse
(74) *Attorney, Agent, or Firm* — Akitaka Kimura; Joseph Kolodka

(57) ABSTRACT

Methods and systems for transmission are shown that include iteratively generating an optimized precoder matrix and optimized linear filters for multiple receivers, where the optimized precoder matrix is based on a linear filter from a previous iteration and the optimized linear filters the multiple receivers are based on a precoder matrix from a previous iteration, precoding an input stream using the iteratively generated optimized precoder matrix to produce transmission streams for the multiple receivers, where at least one receiver has a plurality of associated transmission streams, and transmitting the transmission streams with multiple antennas to the receivers.

19 Claims, 3 Drawing Sheets

(56) References Cited

OTHER PUBLICATIONS

Vishwanath et al., "Duality, Achievable Rates, and Sum-Rate Capacity of Gaussian MIMO Broadcast Channels", IEEE Transactions on Information Theory, vol. 49, No. 10, Oct. 2003, pp. 2658-2668.

Weingarten et al., "The Capacity Region of the Gaussian Multiple-Input Multiple-Output Broadcast Channel", IEEE Transactions on Information Theory, vol. 52, No. 9, Sep. 2006, pp. 3936-3964.

\* cited by examiner

LINEAR PRECODING IN MIMO BROADCAST CHANNEL WITH ARBITRARY RANK CONSTRAINTS

RELATED APPLICATION INFORMATION

This application claims priority to U.S. provisional application Ser. No. 61/384,143 filed on Sep. 17, 2010, incorporated herein by reference.

BACKGROUND

1. Technical Field

The present invention relates to wireless broadcast systems and, in particular, to multiple-input, multiple-output wireless broadcast systems having a constraint on the number of streams that can be transmitted to a user.

2. Description of the Related Art

As the number of mobile wireless users increases, and as the quality of services demands rise, higher data rates are needed to meet demand. In current wireless networks download transfer rate is of primary interest, such that one or a group of base stations should be able to simultaneously transmit data to a group of users, satisfying individual instantaneous or average target bit rates.

Current wireless systems are often based on having a single user transmission per resource block. For example, each user may receive an independent portion of time-frequency resources. However, the use of multiple-input multiple-output (MIMO) antennas in single-user and point-to-point communication systems results in a multiplexing gain in fading channels, scaling up the system throughput linearly with the lesser of the number of antennas at the transmitter and the antennas at the receiver.

Existing technologies are based on a single stream transmission. However, the use of multiple streams in a MIMO broadcast channel can increase individuals' achievable rates. Even proposed standards consider only very limited numbers of streams transmitted to each user. The capacity of a multi-user MIMO system is enhanced by the use of multiple streams and successive interference precancellation techniques called dirty paper coding (DPC). Realization of DPC in practice has been through non-linear precoding approaches and is generally complicated and costly. As such, few practical systems employ DPC. Whether or not DPC is used, an increase in the number of streams increases base station and receiver complexity. As such, little effort has been made to optimize the use of multiple streams and DPC.

SUMMARY

A method for transmission is shown that includes iteratively generating an optimized precoder matrix and optimized linear filters for a plurality of receivers, wherein the optimized precoder matrix is based on a linear filter from a previous iteration and the optimized linear filters for a plurality of receivers are based on a precoder matrix from a previous iteration; precoding an input stream using the iteratively generated optimized precoder matrix to produce transmission streams for the plurality of receivers, where at least one of the plurality of receivers has a plurality of associated transmission streams; and transmitting the transmission streams with a plurality of antennas to the plurality of receivers.

A transmitter is shown that includes a precoder configured to iteratively generate an optimized precoder matrix and linear filters and further configured to precode an input stream using the optimized precoder matrix to produce transmission streams for a plurality of receivers, where at least one of the plurality of receivers has a plurality of associated transmission streams, and a plurality of transmitters configured to transmit the transmission streams to the plurality of receivers. The precoder includes a precoder update module configured to update the precoder matrix based on a linear filter from a previous iteration; and a filter update module configured to update the linear filters for a plurality receivers based on a precoder matrix from a previous iteration.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
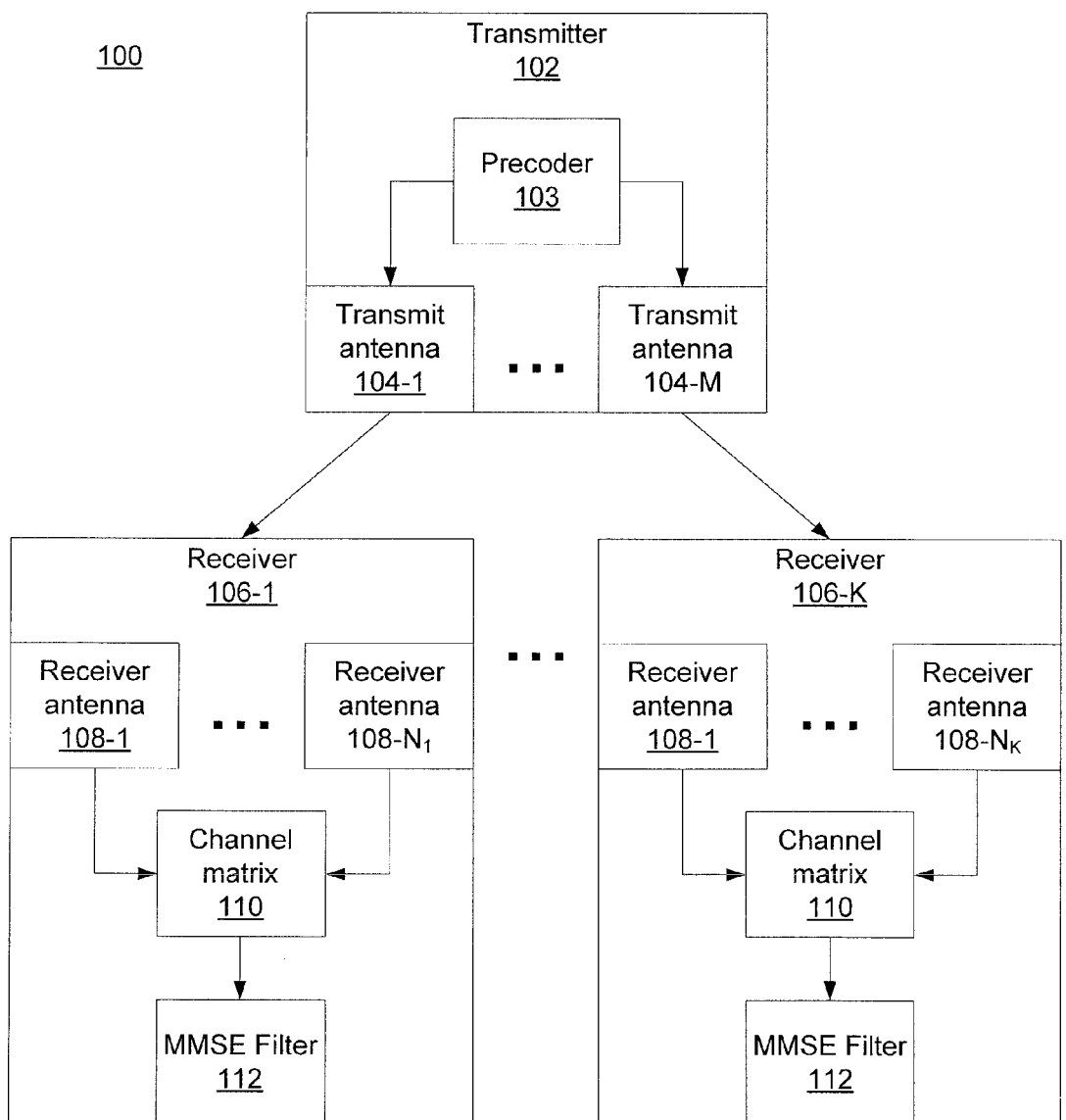
FIG. 1 is a diagram showing an exemplary communication system employing a precoder and filters according to the present principles.

The capacity region of linear precoding without DPC or with constrained numbers of streams in multiple input multiple output (MIMO) broadcast channels (BCs) has not been fully characterized. The convexity of the capacity region of MIMO BC implies that every point on the boundary corresponds to a maximization of the weighted sum rate (WSR) for a particular weight vector. Since the WSR maximization for linear precoding without DPC exhibits a non-convex optimization problem in either primal MIMO BC or the dual multiple access channel (MAC), minimization of weighted sum mean squared error (WSMSE) may alternatively be considered. WSMSE is often easier to solve than the sum rate problem when DPC is not allowed, due to available convex relaxations.

Although related, WSR maximization and WSMSE minimization problems are not equivalent. For the case of a single-antenna receiver, there is a one-to-one mapping between the two, but finding correspondences outside of that special case is not straightforward. Furthermore, for multiple receiving antennas in a multi-stream system, where each user's message can be encapsulated in multiple input streams, minimizing WSMSE entails using as few streams as possible, which degrades the achievable throughput. This motivates separate approaches for finding maximum WSR.

The present principles provide methods and systems for addressing both maximizing WSR and minimizing WSMSE under arbitrary rank constrains. The present principles provide a unified method which solves either problem, whether or not DPC is used.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a MIMO broadcast system 100 is shown. A base station transmitter 102 has M transmit antennas 104 and transmits independent messages to K receivers 106. Each receiver 106 has $N_i$ receiver antennas 108, where $1 \leq i \leq K$. The narrowband channel matrix $H_i$ 110 for each user i is a complex matrix of dimension $N_i \times M$ and the receive vector $y_i$ given by $$y_i = H_i x + n_i, \quad (1)$$

where x is a complex, M-element vector that represents the transmitted signal at the base station transmitter 102 and $n_i$ is the additive white complex Gaussian noise at the receiver antennas 108 of receiver i 106-i.

A vector of independent streams may be transmitted to each receiver 106-i. The vector is represented as $u_i = (u_{i,1}, u_{i,2}, \ldots, u_{i,d_i})^T$, where $d_i$ represents the number of streams for the user i. The collection of all streams to all users forms the input vector $u = (u_1^T, u_1^T, \ldots, u_K^T)^T$. The vector u is multiplied by precoder matrix 103 $G = (G_1, G_2, \ldots, G_K)$ at the transmitter 102 and is of dimension $M \times \Sigma_{i=1}^{K} d_i$, resulting in a vector $x = Gu = (x_1, x_2, \ldots, x_m)^T$ that is broadcast through the M transmit antennas 104. A power constraint $P_T$ at the transmitter 102 implies that trace($GG^*$) $\leq P_T$.

In a DPC scheme, the streams of the K users may be encoded at the transmitter 102 before linear precoding. The DPC allows successive precancellation of the interference seen by the users in an arbitrary order. It may be assumed that DPC is performed in descending order by user index i and that the effect of the DPC scheme is captured by writing the corresponding interference term for every achievable user rate at the receiver 106.

At each receiver antenna 108 of each receiver 106, the received signal is contaminated with complex Gaussian noise which is passed through an optimal linear minimum mean squares error filter 112 $F_i = (f_{i,1}^T, f_{i,2}^T, \ldots, f_{i,d_i}^T)^T$ before detection. Assigning an order to the receivers 106 that matches DPC indexing, where each receiver 106-i is able to cancel interference from all users having an index greater than i, the achievable rate $R_{i,t}$ for the stream $u_{i,t}$ is given as:

$$R_{i,t} \begin{cases} \log\left(1 + \frac{|f_{i,t} H_i g_{i,t}|^2}{\sigma^2 |f_{i,t}|^2 + \sum_{(p,q) \neq (i,t)} |f_{i,t} H_i g_{p,q}|^2}\right) & \theta = 0 \\ \log\left(1 + \frac{|f_{i,t} H_i g_{i,t}|^2}{\sigma^2 |f_{i,t}|^2 + \sum_{(p,q) \neq (i,t), p \leq i} |f_{i,t} H_i g_{p,q}|^2}\right) & \theta = 1, \end{cases} \quad (2)$$

where $\theta = 1$ denotes that DPC is used and $\theta = 0$ denotes that DPC is not used. The quantity $d_i$ determines the maximum number of streams that can be transmitted to the user i and therefore represents an upper bound on the rank of the covariance matrix associated with the $i^{th}$ receiver 106 transmission in the downlink. Optimizing the WSR and WSMSE under arbitrary rank constraints $(d_1, d_2, \ldots, d_K)$ is formulated as finding the optimal transmit precoder 103 and receive filters 112 for all users that optimizes either of the considered objectives.

To capture the rank constraints into the dimensions of the precoding matrices 103 and thus in the objective function, the WSR problem with a given positive weight vector $\alpha = (\alpha_1, \alpha_2, \ldots, \alpha_K)^T$ can be written as:

$$\max_{G, \{F_i\}} \sum_{i=1}^{k} \left(\alpha_i \sum_{t=1}^{d_i} R_{i,t}\right), \quad (3)$$

such that trace($GG^*$) $\leq P_T$. The WSMSE minimization problem can be similarly written as:

$$\max_{G, \{F_i\}} \sum_{i=1}^{k} \left(\alpha_i \sum_{t=1}^{d_i} MSE_{i,t}\right), \quad (4)$$

such that trace($GG^*$) $\leq P_T$, where MSE for the $t^{th}$ stream of user I is defined as:

$$MSE_{i,t} = E(\hat{u}_{i,t} - u_{i,t})^2 \quad (5)$$
$$= |f_{i,t} H_i g_{i,t} - 1|^2$$
$$= f_{i,t}\left(I + \sum_{(j,s) \neq (i,t)} H_i g_{j,s} g_{j,s}^* H_i^*\right) f_{i,t}^*$$

where $\hat{u}_{i,t}$ is the estimate of $u_{i,t}$ at the receiver 106-i and I is the identity matrix. Using the best receiver filter 112 for a given precoder 103 G (i.e., an MMSE filter), the following relationship holds:

$$R_{i,t} = -\log_2(MSE_{i,t}) \quad (6)$$

Therefore the minimum WSMSE problem can be written as:

$$\max_{G, \{F_i\}} \sum_{i=1}^{k} \left(\alpha_i \sum_{t=1}^{d_i} 2^{-R_{i,t}}\right) \quad (7)$$

such that trace($GG^*$) $\leq P_T$.

The latter formulation of the WMSE problem, shown in eq. (7), may be used to find a unified solution to both WSR and WSMSE problems. Hereinafter it may be assumed that $P_T=1$ with the effect of different power constraints in the received signal-to-noise ratio being captured by varying the value of the noise variance.

Equations (3) and (7) may be solved iteratively. The present principles can treat both cases, with or without DPC, and provide a solution that satisfies rank constraints. Although not explicitly stated above, both formulations are considered under the rank constraint vector $(d_1, d_2, \ldots, d_K)$. However, the imposition of rank constraints in WSR and WSMSE takes different forms. The lower ranks are generally more desirable. In WSR, the proposed algorithm is designed to reduce the transmission ranks as much as possible and usually converges to a solution where the rank of the precoding matrices 103 are minimal, such that no further rank reduction is possible. This means that the rank constraints only serve as an upper bound on the number of transmitted streams to a different user. However, the rank constraint in the WSMSE problem cannot be treated in the same way because WSMSE is reduced for the least possible ranks regardless of the power. Therefore, a hard constraint is imposed on the rank in the case of WSMSE.

As noted above, the binary variable $\theta$ denotes whether DPC is used or not. Similarly, the binary parameter $\psi=\{0,1\}$ denotes whether the WSR maximization or WSMSE minimization problem is being considered. For given precoding matrix G 103 and filters $\{F_i\}_{i=1}^K$ 112, the following definitions are used:

$$\xi = |f_{i,t} H_i g_{i,t}|^2 \quad (8)$$

$$\varsigma_{i,t} = \begin{cases} \sigma^2 |f_{i,t}|^2 + \sum_{(p,q) \neq (i,t)} |f_{i,t} H_i g_{p,q}|^2 & \psi = 0 \\ \sigma^2 |f_{i,t}|^2 + \sum_{(p,q) \neq (i,t), p \leq i} |f_{i,t} H_i g_{p,q}|^2 & \psi = 1 \end{cases} \quad (9)$$

$$\lambda_{i,t} = \begin{cases} \alpha_i \left(1 + \frac{\varsigma_{i,t}}{\xi_{i,t}}\right)^{-1} & \psi = 0 \\ \alpha_i \left(1 + \frac{\varsigma_{i,t}}{\xi_{i,t}}\right)^{-1} \xi_{i,t}^{-1} & \psi = 1 \end{cases} \quad (10)$$

$$\delta_{i,t} = \varsigma_{i,t} + \psi \xi_{i,t} \quad (11)$$

$$M_{i,t} = H_i^* f_{i,t}^* f_{i,t} H_i \quad (12)$$

$$\Delta_t = \sum_{t=1}^{d} \lambda_{i,j} |f_{i,t}|^2 \quad (13)$$

$$M = \Xi\left(\frac{\alpha_1 M_{1,1}}{\delta_{1,1}}, \ldots, \frac{\alpha_1 M_{1,t}}{\delta_{1,t}}, \ldots, \frac{\alpha_K M_{K,d_K}}{\delta_{K,d_K}}\right) \quad (14)$$

$$B_i = \sum_{j<i} \sum_{t=1}^{d_j} \frac{\alpha_j \xi_{j,t} M_{j,t}}{(\varsigma_{j,t} + \xi_{j,t}) \delta_{j,t}} \, \forall \, i, 1 \leq i \leq K \quad (15)$$

$$B = \Xi(B_1, B_2, \ldots, B_K) \quad (16)$$

where $\Xi$ indicates the block diagonalization operator. It should be noted that the values of eqs 8-16 are intermediate steps and do not necessarily have physical interpretations.

The first order optimality conditions for both equations (3) and (7) is equivalent to:

$$G = \frac{\mathrm{mat}\{(M + \theta B) \times \mathrm{vec}(G)\}}{\sigma^2 \left(\sum_{i=1}^{K} \Delta_i\right) I + \sum_{i,t} \lambda_{i,t} M_{i,t}} \quad (17)$$

$$F_i = \frac{G_i^* H^*}{\sigma^2 + HGG^* H^* - \theta H \left(\sum_{j=i+1}^{K} G_j G_j^*\right) H^*} \quad (18)$$

where vec(.) is a vector operator which stacks the columns of a matrix into a single vector and mat(.) is the inverse operator of vec(.) with preserved sizing, such that mat(vec(X))=X. It is worth noting that the implicit derivation expression for the transmit precoding matrix G 103 may be obtained by setting the derivative with respect to G to zero in the form G=f(G) as in eq. (17), such that the convergence of an iterative method to find the fixed point of a transformation f(G) highly depends on the form of the decomposition. It should further be noted that the optimality condition found for the received filters 112 found through first order optimality conditions (e.g., $F_i$ in eq. (18)) is the MMSE filter for the $i^{th}$ user, which is an assumption in the WSMSE formulation.

The above derivations are obtained for WSR maximization and WSMSE minimization using the explicit binary parameter $\psi$. Considering that the original problems are non-convex, particularly due to the presence of rank constraints, the proposed principles attempt to converge to a Karush-Kuhn-Tucker (KKT) point that would be a local optimum. In truth, the problems exhibit more than one local optimum, but simulation results show that only a few such optima usually exist. In particular, it is possible in most cases to obtain global optimal solutions, where optimality can be verified through other means. For example, in the case of only one receive antenna 108, the boundary of the achievable rate region can be obtained precisely through uplink/downlink duality. Another exemplary case is when there is no rank constraint and DPC is used. In this case, the optimal point for the WSR maximization problem can be obtained for the dual uplink problem and the solution reached by the present principles also gives the exact same points.

Figure 2:
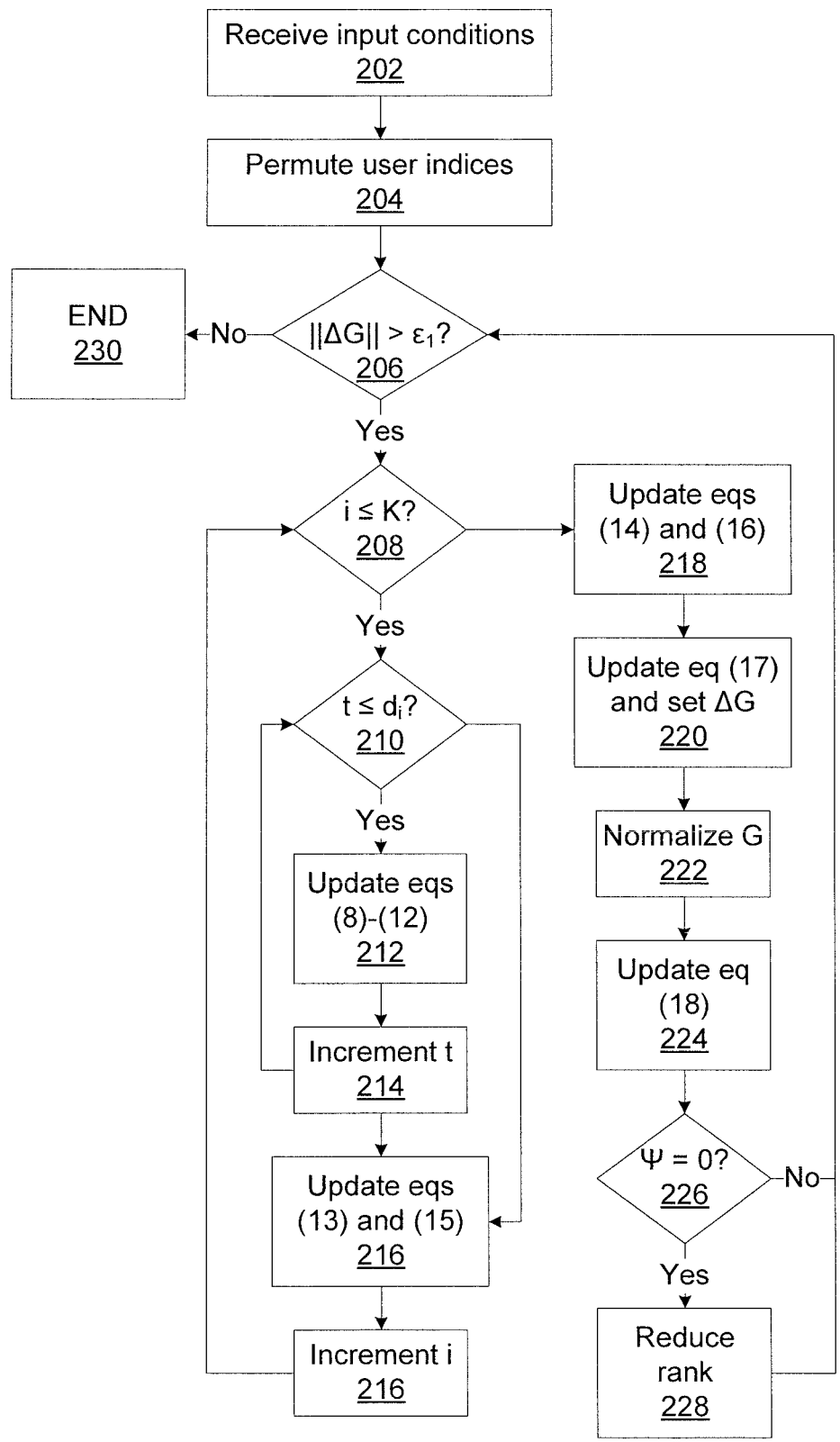
FIG. 2 is a block/flow diagram showing an exemplary precoder and filter update method according to the present principles.

Referring now to FIG. 2, a block/flow diagram showing precoder design for WSR maximization or WSMSE minimization, with or without DPC. As input 202, channel matrices $H_i$ are provided, with a norm threshold $\epsilon>0$ and a termination criterion $\epsilon_1>0$. A weight vector $\alpha$ and upper bounds $(d_1, d_2, \ldots, d_K)$ are also provided. Furthermore, binary variables $\theta$ and $\psi$ are set to specify what problem is to be solved and whether DPC is used. The precoder G 103 begins as a random fill of maximum allowable size having all non-zero columns. If, in the WSR maximization problem one of the columns of the precoder matrix becomes significantly small, that column is removed from G and the rank $d_i$ is decremented.

User indices are permuted 204 such that the weight vector is ordered, $\alpha_1 \leq \alpha_2 \leq \ldots \leq \alpha_K$. A loop then begins, determining whether $\Delta G$ has dropped below the termination criterion 206 (with $\Delta G$ being initialized to a suitable value greater than the threshold criterion). A first nested loop begins over all users i at block 208. For each user, a second nested loop begins over the user's streams t at block 210. The quantities $\varsigma_{i,t}, \xi_{i,t}, \lambda_{i,t}$, and $M_{i,t}$ are updated using equations (8) through (12) in order at block 212. The next stream is selected by incrementing t at block 214 and processing returns to block 210. After all streams have been processed, the quantities $\Delta_i$ and $B_i$ are updated for the user using equations (13) and (15) at block 216. The next user is selected by incrementing i at block 216 and processing returns to block 208.

Once all users have been processed, the quantities M and B are updated using equations 14 and 16 at block 218. A new G is then calculated using equation (17), with ΔG being set to the difference between the new G and the old G. G is then normalized at block 222 by $G=G/\sqrt{\text{trace}(G^*G)}$. The filters $F_i$ are updated using equation (18) in block 224. If WSR maximization is being performed (i.e., if ψ=0), block 226 begins rank reduction 228. Rank reduction 228 finds all users i having streams t such that $\|g_{i,t}\|_2 \leq \epsilon$. For each such user and stream, $g_{i,t}$ is removed from G and the rank of user i is decremented. The above process produces an optimal precoder 103. The intermediate steps in updating equations 13-16 allow for the generation of the optimal precoder 103 but have no important physical meaning on their own.

One issue that arises when using DPC (θ=1) is user ordering. As noted above, block 204 permutes the user indices such that the weight vector α is arranged in order of increasing magnitude. However, DPC assumes a specific user ordering, where encoding order of the users plays a role in maximizing the WSR when DPC is allowed.

Invoking uplink/downlink duality, it is known that a user encoding order of descending order by weight should be used in order to achieve the highest WSR in downlink using DPC. In other words, if $\alpha_i < \alpha_j$ then the message for user i is to be encoded after user j. This result is for the case where there is no rank constraint on the covariance matrices of the transmitted vectors. It is not immediately clear what the optimal user ordering is when the number of transmitted streams is constrained. However, it can be shown that, under any set of upper bounds for the number of streams, the optimal ordering for DPC is still given by the weight vector α, regardless of the channels.

This can be shown by noting that, for any set of covariance matrices having an expectation value of $\Sigma_i = E x_i x_i^*$ in the broadcast channel, there is a transformation $\{\Sigma_i\}_{i=1}^K = \{P_i\}_{i=1}^K$ that results in a set of covariance matrices in the dual MAC network (with the channels transposed). This means that the achievable rate vector in the broadcast channel using $\{\Sigma_i\}_{i=1}^K$ and a given encoding order π is equal to the achievable rate vector in the MAC using $\{P_i\}_{i=1}^K$ and the decoding order opposite of π. In addition, the given transformation has the property that $\Sigma_{i=1}^K \text{trace}(\Sigma_i) = \text{trace}(P_i)$. Also, the ranks of the MAC and broadcast channel covariance matrices is invariant over the transformation between the two. Therefore the rank-constrained WSR maximization in downlink broadcast channel arrangements is equal to the rank-constrained WSR maximization problem in the uplink. This produces the following maximization problem:

$$\max_{\pi, \{P\}_{i=1}^K} \sum_{i=1}^K \alpha_{\pi(i)} \log \frac{\left| I + \sum_{j=i}^K H^*_{\pi(j)} P_{\pi(j)} H_{\pi(j)} \right|}{\left| I + \sum_{j=i+1}^K H^*_{\pi(j)} P_{\pi(j)} H_{\pi(j)} \right|}, \quad (19)$$

such that $P_i \geq 0$, $\text{rank}(P_i) \leq d_i$ $\forall i$ $1 \leq i \leq K$, and $$\sum_{i=1}^K \text{trace}(P_i) \leq 1.$$

Given the objective function in eq. (19) and given $P_i$'s satisfying constrains, the optimum decoding order π is the one for which $\alpha_{\pi(1)} \leq \alpha_{\pi(2)} \leq \ldots \leq \alpha_{\pi(K)}$. This is because if, for some i, $\alpha_{\pi(i)} > \alpha_{\pi(i+1)}$, then the objective function in (19) will increase by swapping the decoding order of i and i+1. Let $B_i = I + \Sigma_{j=i}^K H^*_{\pi(j+1)} P_{\pi(j+1)} H_{\pi(j+1)}$ and $B'_{i+1} = B_1 - H^*_{\pi(j+1)} P_{\pi(j+1)} H_{\pi(j+1)}$ for all $1 \leq i \leq K$. This produces:

$$\alpha_{\pi(i)} \log \frac{|B_i|}{|B_{i+1}|} + \alpha_{\pi(i+1)} \log \frac{|B_{i+1}|}{|B_{i+2}|} - \alpha_{\pi(i+1)} \log \frac{|B_i|}{|B_{i+1}|} - \alpha_{\pi(i)} \log \frac{|B_{i+1}|}{|B_{i+2}|} = \quad (20)$$

$$(\alpha_{\pi(i)} - \alpha_{\pi(i+1)}) \left( \log \frac{|B_i B_{i+2}|}{|b_{i+1} B'_{i+1}|} \right) \leq 0.$$

Equation (20) holds because $B_{i+1} B'_{i+1} \succ B_i B_{i+2} \succ 0$.

Simulations show the benefits to transmission rates using the present principles. In an exemplary test embodiment having four transmit antennas 104 and two receivers 106, each having three receiver antennas 108, the channel matrices $H_i$ 110 employed were:

$$H_1 = \begin{bmatrix} 2.84e^{-1.7i} & 2.22e^{1.9i} & 0.68e^{-2.4i} & 2.14e^{1.7i} \\ 2.14e^{-2.7i} & 0.68e^{-3.0i} & 0.75e^{-0.9i} & 0.48e^{1.6i} \\ 2.24e^{3.0i} & 0.75e^{-0.8i} & 1.07e^{2.7i} & 1.45e^{1.9i} \end{bmatrix} \quad (21)$$

$$H_2 = \begin{bmatrix} 3.67e^{3.0i} & 1.77e^{0.7i} & 4.25e^{2.1i} & 1.09e^{0.0i} \\ 3.36e^{3.0i} & 2.14e^{-1.6i} & 2.70e^{-1.0i} & 2.52e^{0.5i} \\ 2.90e^{1.9i} & 1.98e^{-2.8i} & 4.84e^{0.4i} & 0.28e^{-0.3i} \end{bmatrix}$$

A weighting vector of α=[2,1] is used for the WSR problem. Comparing the present principles, with and without DPC, to prior art techniques, shows a substantial increase in achievable rate. This increase is even more marked in systems with greater numbers of users 106 and receiver antennas 108.

Figure 3:
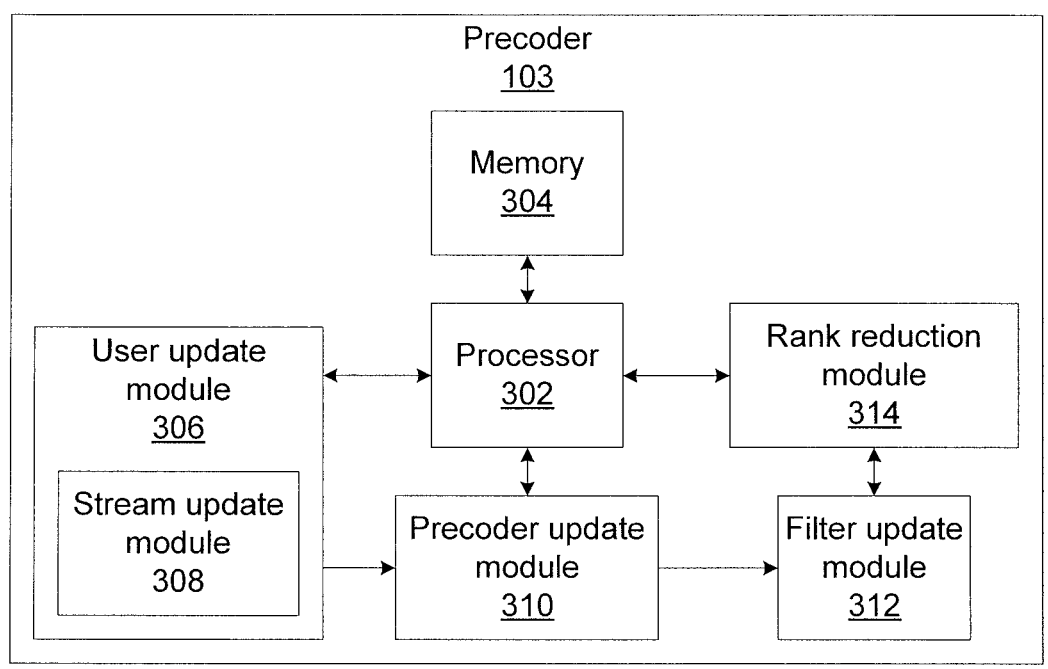
FIG. 3 is a diagram showing a detailed view of a precoder according to the present principles.

Referring now to FIG. 3, more detail on precoder module 103 is shown. A processor 302 has access to memory 304, which may be, e.g., volatile memory such as RAM, nonvolatile solid state memory such as flash memory, or hard drives. The processor communicates with a user update module 306, a precoder update module 310, a filter update module 312, and a rank reduction module 314. The user update module updates precoder information for each user and includes a stream update module 308 to update each user's individual streams. The precoder update module uses the information from user update module 306 to update the precoder to produce an optimal precoder matrix. The filter update module 312 generates minimum mean squares error filters that may be communicated to the receivers 106 for use in filters 112. Alternatively, the receiver filters 112 may independently perform filter updates, as it may be assumed that the channel information is known to all parties. The rank reduction module 314 removes columns from the precoder matrix having a norm below a rank threshold if WSR maximization is used.

Having described preferred embodiments of a system and method of linear precoding in MIMO broadcast channels with arbitrary rank constraints (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for transmission, comprising:
iteratively generating an optimized precoder matrix and updating minimum mean square error (MMSE) filters for a plurality of receivers, wherein the optimized precoder matrix is based on an MMSE filter from a first previous iteration of the MMSE filter, and the MMSE filters for the plurality of receivers are based on a precoder matrix from a second previous iteration of the precoder matrix;
precoding data over an input stream using the optimized precoder matrix to produce transmitted signals over transmission streams for the plurality of receivers, where each receiver is located at a user and at least one of the plurality of receivers has a plurality of reception antennas; and
transmitting the transmitted signals with a plurality of transmission antennas to the plurality of receivers.

2. The method of claim 1, further comprising;
communicating said MMSE filters to the plurality of receivers.

3. The method of claim 1,
wherein a count of transmission streams associated with each user for receiving a respective transmitted signal is below a threshold rank.

4. The method of claim 1,
wherein the optimized precoder matrix is generated iteratively over each user for receiving a respective transmitted signal.

5. The method of claim 4,
wherein precoder iterations continue until a difference between successive iterations falls below a threshold.

6. The method of claim 1,
wherein iteratively generating the optimized precoder matrix includes:
using a weighted sum rate.

7. The method of claim 1, further comprising;
reducing a rank of the optimized precoder matrix by removing columns of the optimized precoder matrix having a norm that falls below a norm threshold.

8. The method of claim 1,
wherein iteratively generating the optimized precoder matrix includes:
using a weighted sum mean square error.

9. The method of claim 1,
wherein the optimized precoder matrix accounts for interference precompensation using dirty paper coding.

10. The method of claim 9,
wherein an ordering of users for receiving respective transmitted signals is based on a weight of the users for receiving respective transmitted signals in a weighted sum-rate objective function.

11. A transmitter, comprising:
a precoder configured to iteratively generate an optimized precoder matrix, update minimum mean square error (MMSE) filters, and precode data over an input stream using the optimized precoder matrix to produce transmitted signals over transmission streams for a plurality of receivers, where each receiver is located at a user and at least one of the plurality of receivers has a plurality of reception antennas, the precoder comprising:
a precoder update module configured to update the optimized precoder matrix based on an MMSE filter from a first previous iteration of the MMSE filter; and
a filter update module configured to update the MMSE filters for the plurality receivers based on a precoder matrix from a second previous iteration of the precoder matrix; and
a plurality of transmission antennas configured to transmit the transmitted signals to the plurality of receivers.

12. The transmitter of claim 11,
wherein the precoder update module being configured to iteratively generate the optimized precoder matrix is used over each user for receiving a respective transmitted signal.

13. The transmitter of claim 12,
wherein the precoder update module is configured to perform iterations until a difference between successive iterations falls below a threshold.

14. The transmitter of claim 11,
wherein a count of transmission streams associated with each user for receiving a respective transmitted signal is below a threshold rank.

15. The transmitter of claim 11,
wherein the precoder update module is further configured to adjust the optimized precoder matrix using a weighted sum rate.

16. The transmitter of claim 11,
wherein the precoder further comprises a rank reduction module configured to reduce a rank of the optimized precoder matrix by removing columns of the optimized precoder matrix having a norm that falls below a norm threshold.

17. The transmitter of claim 11,
wherein the precoder update module is further configured to adjust the optimized precoder matrix using a weighted sum mean square error.

18. The transmitter of claim 11,
wherein the optimized precoder matrix accounts for interference precompensation using dirty paper coding.

19. The transmitter of claim 18,
wherein an ordering of users for receiving respective transmitted signals is based on a weight of the users for receiving respective transmitted signals in a weighted sum-rate objective function.

* * * * *